United States Patent
Shih et al.

(10) Patent No.: US 9,795,928 B2
(45) Date of Patent: Oct. 24, 2017

(54) STEPWISE INTERFACIAL POLYMERIZATION TECHNIQUE WITH DIFFERENT REAGENT SOLUTION DESIGNS TO PREPARE HOLLOW FIBER NANOFILTRATION MEMBRANE COMPOSITES

(71) Applicant: Nano and Advanced Materials Institute Limited, Hong Kong (HK)

(72) Inventors: Kaimin Shih, Hong Kong (HK); Guoqing Zhang, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 470 days.

(21) Appl. No.: 14/465,819

(22) Filed: Aug. 21, 2014

(65) Prior Publication Data
US 2015/0367293 A1    Dec. 24, 2015

Related U.S. Application Data

(60) Provisional application No. 61/998,286, filed on Jun. 24, 2014.

(51) Int. Cl.
| | | |
|---|---|---|
| *B01D 69/02* | (2006.01) | |
| *B01D 69/08* | (2006.01) | |
| *B01D 69/12* | (2006.01) | |
| *B01D 71/56* | (2006.01) | |
| *B01D 71/82* | (2006.01) | |
| *B01D 61/02* | (2006.01) | |

(52) U.S. Cl.
CPC ............ *B01D 69/02* (2013.01); *B01D 69/08* (2013.01); *B01D 69/087* (2013.01); *B01D 69/125* (2013.01); *B01D 71/56* (2013.01); *B01D 71/82* (2013.01); *B01D 61/027* (2013.01); *B01D 2323/30* (2013.01); *B01D 2323/40* (2013.01)

(58) Field of Classification Search
None
See application file for complete search history.

(56) References Cited

U.S. PATENT DOCUMENTS

| | | |
|---|---|---|
| 3,904,519 A | 9/1975 | Mckinney, Jr. et al. |
| 3,996,318 A | 12/1976 | van Heuven |
| | (Continued) | |

OTHER PUBLICATIONS

Mixed polyamide-based composite nanofiltration.pdf—Mixed polyamide-based composite nanofiltration hollow fiber membranes with improved low-pressure water softening capability—Fang, Wangxi et al—Journal of Membrane Science, Jun. 2, 2014.*

(Continued)

*Primary Examiner* — Krishnan S Menon
*Assistant Examiner* — Bradley R Spies
(74) *Attorney, Agent, or Firm* — Spruson & Ferguson (HK)

(57) ABSTRACT

Novel low-pressure nanofiltration membrane composites for rejecting organic compounds are prepared by interfacial polymerization on a microporous hollow fiber supporting membrane. The interfacial polymerization reaction is carried out using an essentially monomeric polyamine reactant having at least two amine functional groups per molecule, and an essentially monomeric amine-reactive polyfunctional aromatic or cycloaliphatic acyl halide having at least two acyl halide groups per molecule. The composite can be fabricated by stepwise polymerization reactions with different reactant recipes at each step.

11 Claims, 7 Drawing Sheets

(56) References Cited

U.S. PATENT DOCUMENTS

| | | |
|---|---|---|
| 4,167,567 A | 9/1979 | McCall |
| 4,259,183 A | 3/1981 | Cadotte |
| 4,277,344 A | 7/1981 | Cadotte |
| 4,529,646 A | 7/1985 | Sundet |
| 4,613,878 A | 9/1986 | Inaba et al. |
| 4,619,767 A | 10/1986 | Kamiyama et al. |
| 4,661,254 A | 4/1987 | Zupancic et al. |
| 4,761,234 A | 8/1988 | Uemura et al. |
| 4,769,148 A | 9/1988 | Fibiger et al. |
| 4,772,394 A | 9/1988 | Swedo et al. |
| 4,778,596 A | 10/1988 | Linder et al. |
| 4,783,346 A | 11/1988 | Sundet |
| 4,802,984 A | 2/1989 | Waite |
| 4,828,708 A | 5/1989 | Bray |
| 4,830,885 A | 5/1989 | Tran et al. |
| 4,859,384 A | 8/1989 | Fibiger et al. |
| 4,872,984 A | 10/1989 | Tomaschke |
| 4,885,091 A | 12/1989 | Swedo et al. |
| 4,913,816 A | 4/1990 | Waite |
| 4,948,507 A | 8/1990 | Tomaschke |
| 4,983,291 A | 1/1991 | Chau et al. |
| 5,152,901 A | 10/1992 | Hodgdon |
| 5,160,619 A | 11/1992 | Yamaguchi et al. |
| 5,178,766 A | 1/1993 | Ikeda et al. |
| 5,246,587 A | 9/1993 | Tomaschke |
| 5,254,261 A | 10/1993 | Tomaschke et al. |
| 5,616,249 A | 4/1997 | Hodgdon |
| 5,658,460 A | 8/1997 | Cadotte et al. |
| 5,693,227 A | 12/1997 | Costa |
| 5,922,203 A | 7/1999 | Tomaschke |
| 6,177,011 B1 | 1/2001 | Hachisuka et al. |
| 6,183,640 B1 | 2/2001 | Wang |
| 6,245,234 B1 | 6/2001 | Koo et al. |
| 6,464,873 B1 | 10/2002 | Tomaschke |
| 6,833,073 B2 | 12/2004 | Agarwal |
| 7,001,518 B1 | 2/2006 | Tomaschke |
| 7,138,058 B2 | 11/2006 | Kurth et al. |
| 2010/0044314 A1* | 2/2010 | Zhang .................... B01D 71/68 210/646 |
| 2010/0224555 A1* | 9/2010 | Hoek ................. B01D 67/0088 210/500.42 |
| 2012/0012527 A1* | 1/2012 | Allen ................... B01D 61/027 210/654 |

OTHER PUBLICATIONS

Beibei Tang, et al., Study on a novel polyester composite nanofiltration membrane by interfacial polymerization of triethanolamine (TEOA) and trimesoyl chloride (TMC) I. Preparation, characterization and nanofiltration properties test of membrane, Journal of Membrane Science 320 (2008) 198-205.

P.R. Buch, et al., Preparation, characterization and chlorine stability of aromatic-cycloaliphatic polyamide thin film composite membranes, Journal of Membrane Science 309 (2008) 36-44.

Y. Mansourpanah, Fabrication and development of interfacial polymerized thin-film composite nanofiltration membrane using different surfactants in organic phase; study of morphology and performance, Journal of Membrane Science 343 (2009) 219-228.

Lei Li., et al., Preparation and characterization of poly(piperazineamide) composite nanofiltration membrane by interfacial polymerization of 3,3,5,5-biphenyl tetraacyl chloride and piperazine, Journal of Membrane Science 335 (2009) 133-139.

Wangxi Fang, et al., Intertacially polymerized composite nanofiltration hollowfiber membranes for low-pressure water softening, Journal of Membrane Science 430 (2013) 129-139.

* cited by examiner

STEPWISE INTERFACIAL POLYMERIZATION TECHNIQUE WITH DIFFERENT REAGENT SOLUTION DESIGNS TO PREPARE HOLLOW FIBER NANOFILTRATION MEMBRANE COMPOSITES

CROSS REFERENCE TO RELATED APPLICATION

Pursuant to 35 U.S.C. §119(e), this is a non-provisional patent application which claims benefit from U.S. provisional patent application Ser. No. 61/998,286 filed Jun. 24, 2014, and the disclosure of which is incorporated herein by reference.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to nanofiltration membrane composite. More particularly, the present invention relates to a hollow fiber nanofiltration membrane, and a stepwise fabrication method to produce the hollow fiber nanofiltration membrane composite.

BACKGROUND

Pressure driven separation membrane, such as reverse osmosis (RO), ultrafiltration (UF) and nanofiltration (NF), are of important roles in many industrial applications where the organic molecules or inorganic ions in aqueous solutions can be concentrated or separated by a positive osmotic pressure to one side of a filtration membrane.

Therein nanofiltration (NF) is a membrane filtration capability which can be used to filter both natural and synthetic organic compounds. Nanofiltration is relatively a newer filtration strategy ranging in between ultrafiltration (UF) and reverse osmosis (RO). The nominal pore size of NF membrane is typically around 1 nm For application purposes, the rejection capability of NF membranes is generally evaluated by molecular weight cut-off (MWCO) instead of the nominal pore size. The molecular weight cut-off for NF is normally regarded as 400 Da. The required transmembrane pressure (pressure drop across the membrane) for NF is at least 0.5 MPa, but this pressure is much lower than that used for RO. Therefore, the capital cost (the need for system to withstand high pressure) and operation cost (the energy input to generate high pressure) for NF can be significantly reduced.

The NF membranes can be designed with a composite structure and fabricated by performing the interfacial polymerization reaction onto a microporous polymer support. Nanofiltration membranes are structurally very similar to reverse osmosis membranes and typically are cross-linked aromatic polyamides cast as a thin layer. Nowadays, nanofiltration membranes are widely applied in the industrial wastewater treatment, power generation, food & beverage processing, municipal desalination and water reuse, and home drinking water devices, etc. Currently, several companies, such as GE, Koch, TriSep, Dow FilmTec, are recognized as the leaders in RO and NF commercial membrane products.

U.S. Pat. No. 5,152,901 provides a method to prepare polyamine-polyamide composite nanofiltration membrane for water softening.

U.S. Pat. No. 5,922,203 discloses amine monomers and their use in preparing interfacially synthesized membranes for reverse osmosis and nanofiltration.

U.S. Pat. No. 6,464,873 discloses an interfacially polymerized process for reverse osmosis on a microporous support with an essentially monomeric bipiperidine reactant, and an essentially monomeric amine-reactive polyfunctional aromatic or cycloaliphatic acyl halide.

U.S. Pat. No. 6,833,073 provides a method for producing nanofiltration and reverse osmosis membranes that may be used in a number of commercial applications.

U.S. Pat. No. 7,001,518 discloses the production method for a low pressure reverse osmosis and nanofiltration membranes.

U.S. Pat. No. 7,138,058 discloses an acid stable membrane for nanofiltration, which allow for the efficient processing of feed solutions containing acids.

However, there are still needs to further create new products with improved performance, cost-effective fabrication, and diversified configurations to fit the increasing demands of wider NF application. Current NF patents and products are mostly for sheet membranes, but the hollow fiber membranes have increasingly adopted for many filtration needs due to its easy cleaning and lower fouling tendency.

Consequently, there is an unmet need to have an efficient and cost-effective method to fabricate hollow fiber NF membrane composite products aiming for separating or concentrating organic compounds from solutions with a lower operation pressure and higher rejection rate.

SUMMARY OF THE INVENTION

A first aspect of the presently claimed invention is to provide a hollow fiber NF membrane composite.

In accordance with an embodiment of the presently claimed invention, the hollow fiber NF membrane comprises: a hollow fiber UF membrane; a polymer layer formed on the inner surface of the hollow fiber UF membrane, and comprising a first cross-linked aromatic polyamides; and a NF-functionalized layer formed on the first polymer layer, and comprising a second cross-linked aromatic polyamides.

A second aspect of the presently claimed invention is to provide a method for fabricating a hollow fiber NF membrane composite.

In accordance with an embodiment of the presently claimed invention, the method for fabricating a hollow fiber NF membrane composite comprises: providing at least one hollow fiber ultrafiltration membrane; injecting a first monomeric polyamine reactant into at least one hollow channel of the hollow fiber UF membrane; injecting a first monomeric amine-reactive polyfunctional aromatic or cycloaliphatic acyl halide into the hollow channel of the hollow fiber UF membrane to react with the first monomeric polyamine reactant to from a polymer layer on an inner surface of the hollow fiber UF membrane through a first interfacial polymerization; injecting a second monomeric polyamine reactant into the hollow channel of the hollow fiber UF membrane; and injecting a second monomeric amine-reactive polyfunctional aromatic or cycloaliphatic acyl halide into the hollow channel of the hollow fiber UF membrane to react with the second monomeric polyamine reactant to from a NF-functionalized layer on the polymer layer through a second interfacial polymerization.

Preferably, the first monomeric polyamine reactant comprises at least one first molecule, and the second monomeric polyamine reactant comprises at least one second molecule, and a molecular weight of the first molecule is higher than a molecular weight of the second molecule. The molecular weight of the first molecule is in a range of 20,000-60,000 g/mol, and the molecular weight of the second molecule is in a range of 80-200 g/mol.

A third aspect of the presently claimed invention is to provide a system for fabricating a hollow fiber NF membrane composite.

In accordance with an embodiment of the presently claimed invention, the system for fabricating a hollow fiber NF membrane composite comprises: a reactant tank for holding reactants; a membrane module for holding the hollow fiber UF membrane; a tube for transporting the reactants; and a pump for injecting the reactants into the hollow fiber UF membrane.

This invention provides a new method to fabricate hollow fiber NF membrane composite products aiming for separating or concentrating organic compounds from solutions with a lower operation pressure.

This invention provides a stepwise fabrication method to produce hollow fiber NF membrane composites with a molecular weight cut off at 400 Da for organic compounds and operated at a pressure less than 0.5 MPa. Further performance requirements for this product include a flux range in 8-20 L/m$^2$hr, a rejection rate higher than 80%, and the capability of handling pH 2-10 feed solution and working at 10-40° C. condition. The optimal reactants and recipes used for this invention are extensively investigated by interfacial polymerization experiments. The fabricated products may also be applied in systems involving aqueous solutions with more than one solute and are suitable for selective separation or concentration purposes.

BRIEF DESCRIPTION OF THE DRAWINGS

Embodiments of the present invention are described in more detail hereinafter with reference to the drawings, in which.

DETAILED DESCRIPTION OF PREFERRED EMBODIMENTS

In the following description, a plurality of hollow fiber NF membranes, and methods and systems for fabricating the hollow fiber NF membrane composites are set forth as preferred examples. It will be apparent to those skilled in the art that modifications, including additions and/or substitutions, may be made without departing from the scope and spirit of the invention. Specific details may be omitted so as not to obscure the invention; however, the disclosure is written to enable one skilled in the art to practice the teachings herein without undue experimentation.

As used therein, the NF membrane composite comprises more than one type of materials to reach the goal of being a membrane product to function NF. The NF membrane composite is a type of NF membrane.

Novel low-pressure nanofiltration membrane composites for rejecting organic compounds are prepared by stepwise interfacial polymerization on a microporous hollow fiber supporting membrane. The uniqueness of the present invention is (1) the use of interactions among the branched polyethyleneimine, 1, 3-phenylenediamine, and piperazine anhydrous for the NF functional layer materials; (2) the use of multiple interfacial polymerization steps to create different composite structures for the NF functional layers; and (3) the fabrication of such NF functional layers on hollow fiber membranes. The most important advantages of this invention are the flexibility of creating different functional layer structures for hollow fiber NF membrane composites, and the hollow fiber NF membrane composite products capable of operating at a lower (less than 0.5 MPa) pressure.

Figure 1:
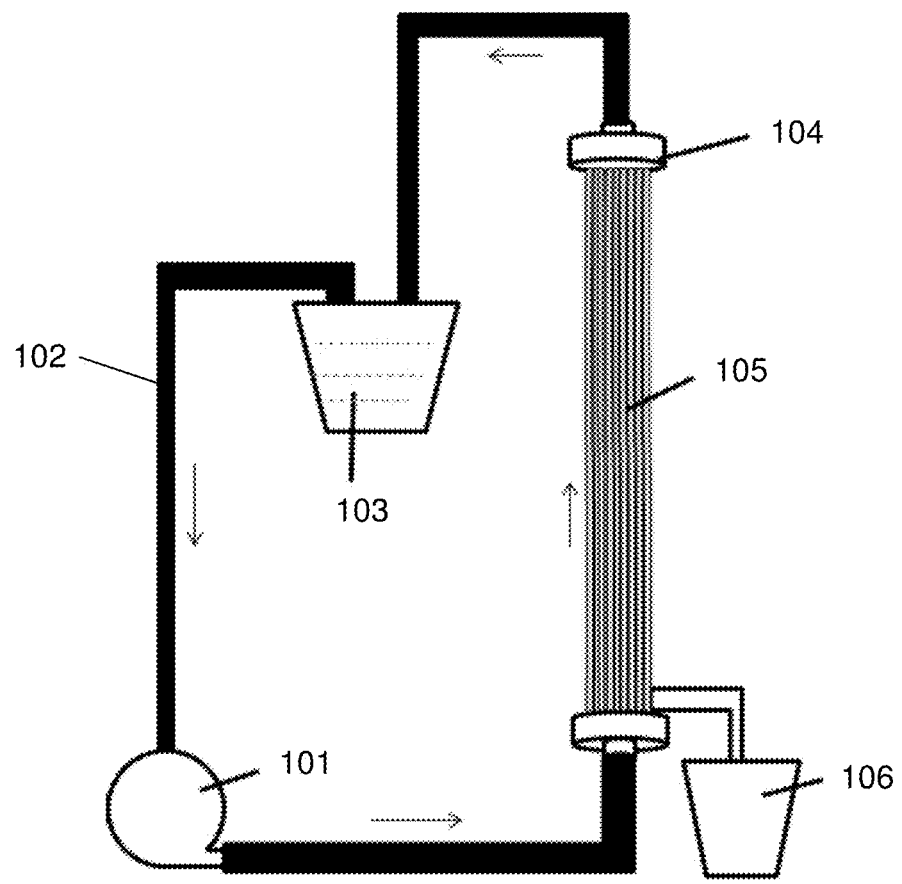
FIG. 1 is a schematic diagram showing a system for fabricating a hollow fiber NF membrane composite through stepwise interfacial polymerization (IFP) according to an embodiment of the presently claimed invention.

FIG. 1 is a schematic diagram showing a system for fabricating a hollow fiber NF membrane composite through stepwise interfacial polymerization according to an embodiment of the presently claimed invention. The system comprises a pump 101, tubes 102, a reactant tank 103, a membrane module 104, a plurality of base fiber membranes 105, and an excess solution tank 106. The pump 101 is used to pump reactants from the reactant tank 103 through the tubes 102 into the membrane module 104. The reactants are injected into the base fiber membranes 105 from the membrane module 104, and the excess reactants are then collected at the excess solution tank 106, or the reactant tank 103 respectively.

Figure 2:
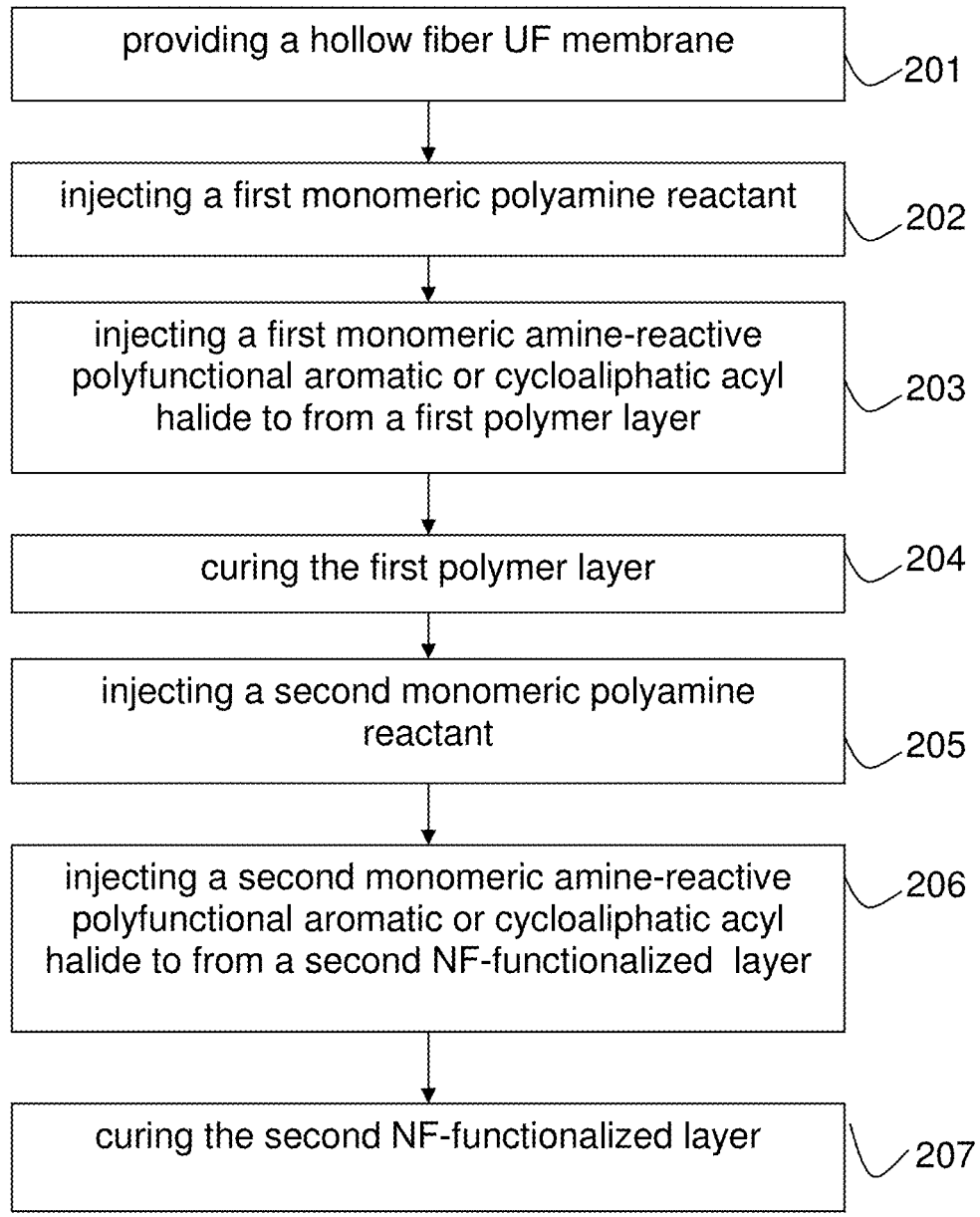
FIG. 2 is a flow chart showing the steps of a method for fabricating a hollow fiber NF membrane composites through stepwise interfacial polymerization according to an embodiment of the presently claimed invention.
Figure 3:
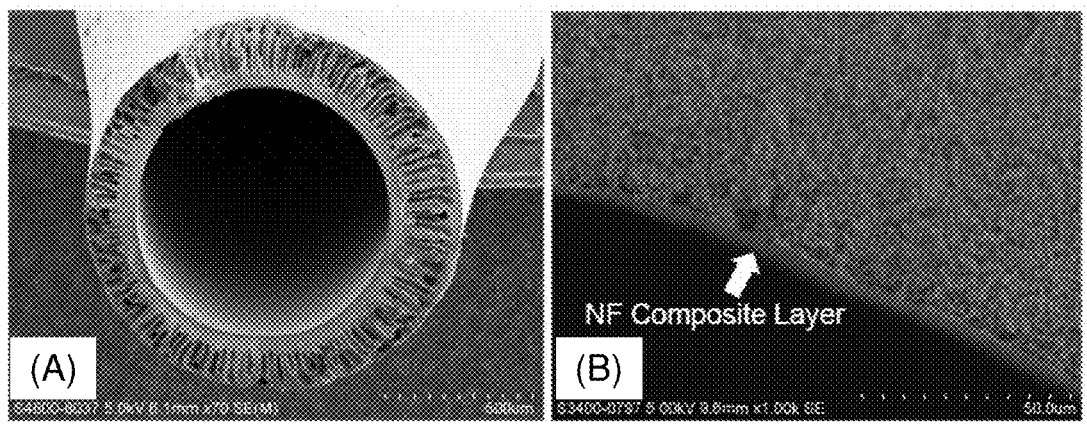
FIG. 3A-B show SEM images of a hollow fiber NF membrane and its inner-wall composite layer respectively prepared in Example 1 of the presently claimed invention.

FIG. 2 is a flow chart showing the steps of a method for fabricating a hollow fiber NF membrane composite through stepwise interfacial polymerizations according to an embodiment of the presently claimed invention. In step 201, a hollow fiber UF membrane is provided. In step 202, a first monomeric polyamine reactant is injected into a hollow channel of the hollow fiber UF membrane. In step 203, a first monomeric amine-reactive polyfunctional aromatic or cycloaliphatic acyl halide is injected into the hollow channel of the hollow fiber UF membrane to react with the first monomeric polyamine reactant to from a first polymer layer on an inner surface of the hollow fiber UF membrane through a first interfacial polymerization. In step 204, the first polymer layer is cured. In step 205, a second monomeric polyamine reactant is injected into the hollow channel of the hollow fiber UF membrane. In step 206, a second monomeric amine-reactive polyfunctional aromatic or cycloaliphatic acyl halide is injected into the hollow channel of the hollow fiber UF membrane to react with the second monomeric polyamine reactant to form a second NF-functionalized layer on the first polymer layer through a second interfacial polymerization. In step 207, the second NF-functionalized layer for this NF composite is cured.

The interfacial polymerization reaction is carried out using an essentially monomeric polyamine reactant having at least two amine functional groups per molecule, and an essentially monomeric amine-reactive polyfunctional aromatic or cycloaliphatic acyl halide having at least about two acyl halide groups per molecule.

The polymerization can be fabricated by multiple polymerization steps with different reactant recipes at each step. For example, double layers are casted with different reactant set designs. A macromolecule reactant (such as PEI) with molecular weight of 20,000-60,000 g/mol is introduced to build the base and porous structure of this composite layer. This base structure is then topped by another membrane layer produced by using a smaller-molecule reactant (such as MPD) with molecular weight of 80-200 g/mol to simultaneously achieve the NF rejection goal by a lower pressure requirement.

The advantage of two-layer structure is the flexibility of creating different functional layers on the membrane surface. For example, the second layer can use more MPD (1,3-phenylenediamine) to enhance the acid resistance. In addition, the design of using large molecules as the first layer (such as PEI) with smaller molecules as the second layer (such as MPD) also creates a solid (with the large branched molecules anchoring on the supporting matrix) and effective NF function (with smaller molecules creating tighter polymers filling in the pores of larger molecule layer).

Preferred polyamine compounds and their designs are shown in Table 1. All the reagents used in this invention are of purity above 99.5 wt. % and without any further purification before utilization. Table 1 shows reactants and solution compositions used in the present invention as below.

TABLE 1

| Solution | Reactant | Solvent | wt. % | Substrate |
|---|---|---|---|---|
| A1 | PEI | Water | 0.1-0.5 | PVDF |
|  | PIP |  | 0.05-0.2 | or PES |
| A2 | MPD | Water | 0.05-0.2 | hollow |
|  | SDS |  | 0.1 | fibers |
| B | TMC | Hexane | 0.1 |  |

PEI: Branched polyethyleneimine (($CH_2CH_2NH$)$_n$, MW = 30,000-50,000)
PIP: Piperazine anhydrous ($C_4H_{10}N_2$, MW = 86.14)
MPD: 1, 3-phenylenediamine ($C_6H_8N_2$, MW = 108.14)
SDS: Sodium dodecyl sulfate ($C_{12}H_{25}NaSO_4$, MW = 288.38)
TMC: Trimesoylchloride ($C_9H_3Cl_3O_3$, MW = 265.48)
PVDF: Polyvinylidene fluoride (-[$C_2H_2F_2$]$_n$-)
PES: Polyethersulfone (-[$OC_6H_4OC_6H_4SO_2C_6H_4$]$_n$-)

Using the above solutions, NF composites are coated on the inner surface of a UF hollow fiber substrate through the hollow fiber nanofiltration membrane system shown in FIG. 1. The process is started by injecting Solution A1 into the hollow channels of fibers until the fibers were fully infiltrated. Solution B is then slowly injected into the fibers to complete the polymerization reaction. After draining off the excess solution, the membrane composites are heat treated at 50-80° C. for 1-5 hours. Accordingly, the first polymer layer is created from PEI (Branched polyethyleneimine) and modified by PIP (Piperazine anhydrous). The second polymerization step can be carried out through replacing Solution A1 by Solution A2 to repeat the above process to form a second polymer layer. Accordingly, the second NF functionalized layer is the polymer created from MPD (1, 3-phenylenediamine) and modified by SDS (Sodiumdodecylsulfate). Based on this fabrication strategy, the composite products can be generated to act as the membranes for nanofiltration purposes.

EXAMPLE 1

Based on the design principle shown in Table 1, Solution A1 was prepared by mixing 0.2% PEI and 0.1% PIP in water; Solution A2 was of 0.1% MPD and 0.1% SDS; and Solution B was of 0.1% TMC in hexane. The first interfacial polymerization (IFP) was carried out using Solution A1 and Solution B on the inner surface of the PVDF hollow fiber UF membranes. After ageing at 60° C. for 2 hours, the second layer was fabricated by IFP again with Solution A2 and Solution B. The membrane composites were then rinsed by deionized (DI) water for 10 minutes followed by a heat treatment at 60° C. for 5 hours.

Figure 4:
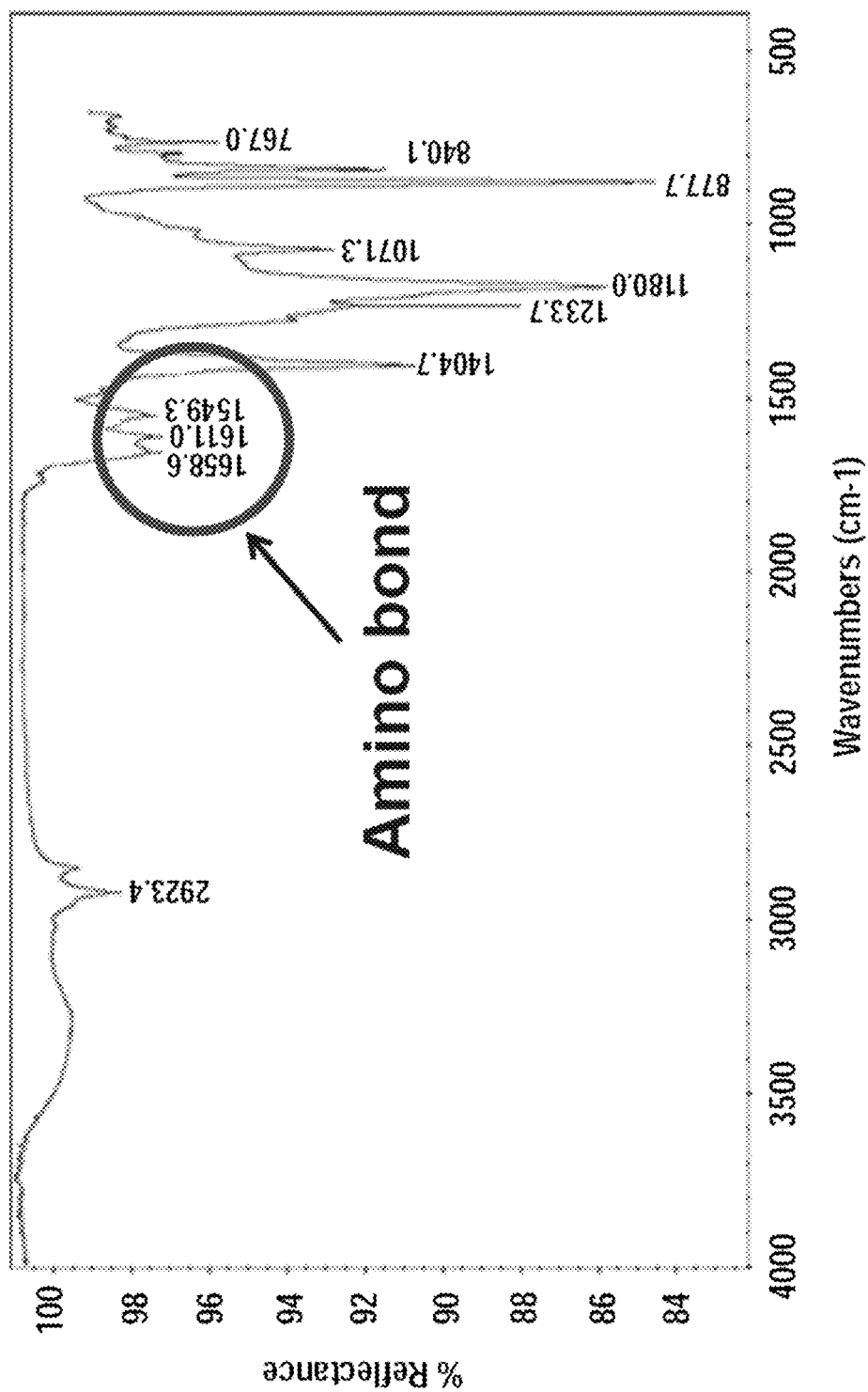
FIG. 4 is an IR spectrum of an inner surface of membrane prepared in Example 1.
Figure 5:
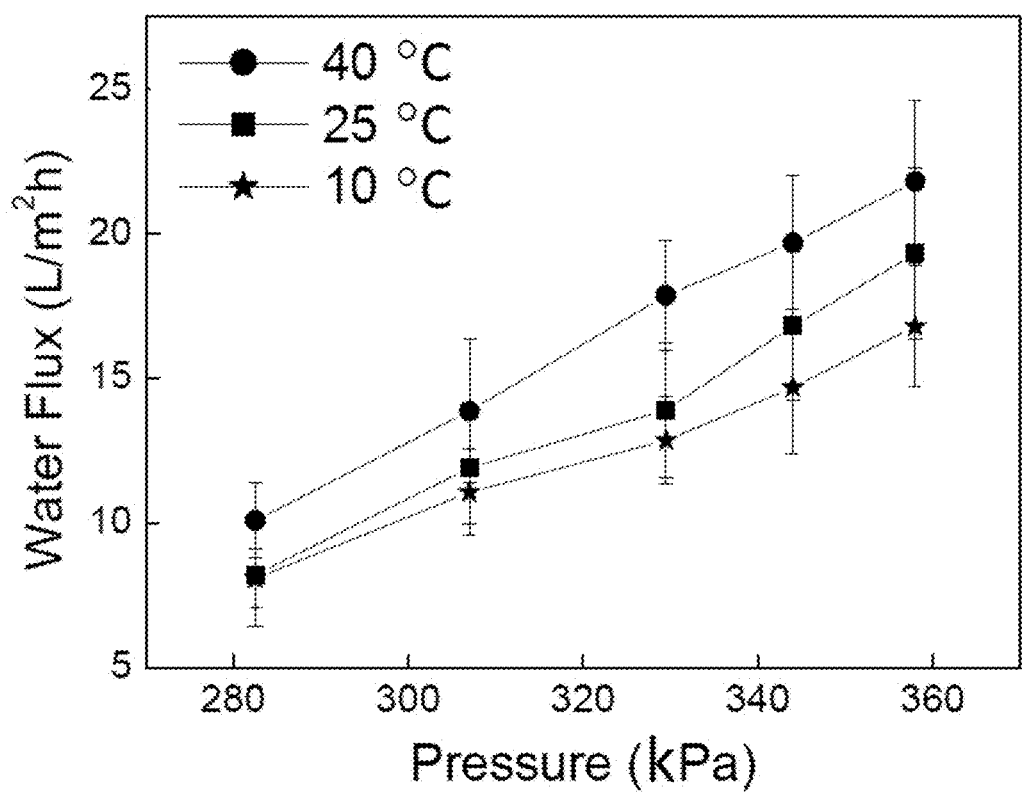
FIG. 5 is a graph showing water flux values of the selected samples within the operation pressure range of 282-358 kPa at temperatures 10-40° C. according to Example 1.

FIG. 4 is an IR spectrum of an inner surface of membrane prepared in Example 1. The absorption peaks locating at 1611 and 1458 cm$^{-1}$ indicate the amide bonds of the PA layer. The water flux values of this composite when operating at 280-360 kPa (0.28-0.36 MPa) and at temperatures of 10, 25 and 40° C. can range from 8 to 22 L/m$^2$hr as shown in FIG. 5, illustrating that the membrane product comprising the NF membrane composite of Example 1 capable of providing high water flux values.

EXAMPLE 2

Figure 6:
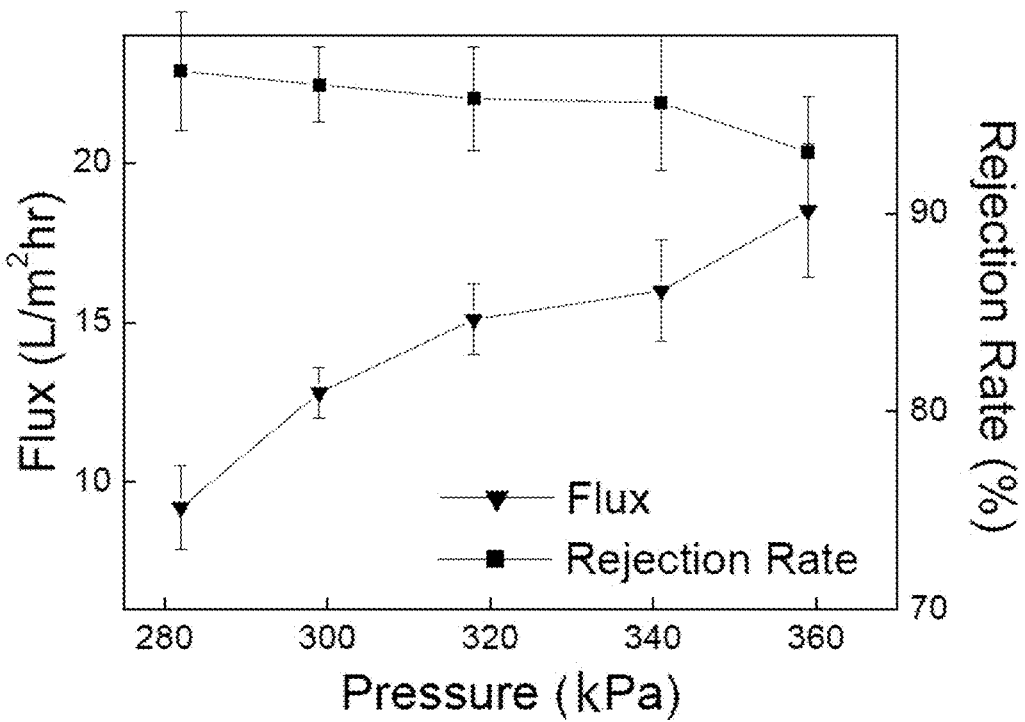
FIG. 6 is a graph showing rejection rates and flux performance of the fabricated sample operated within a pressure range of 282-358 kPa with a feed solution of pH 10 according to Example 2 of the presently claimed invention.
Figure 7:
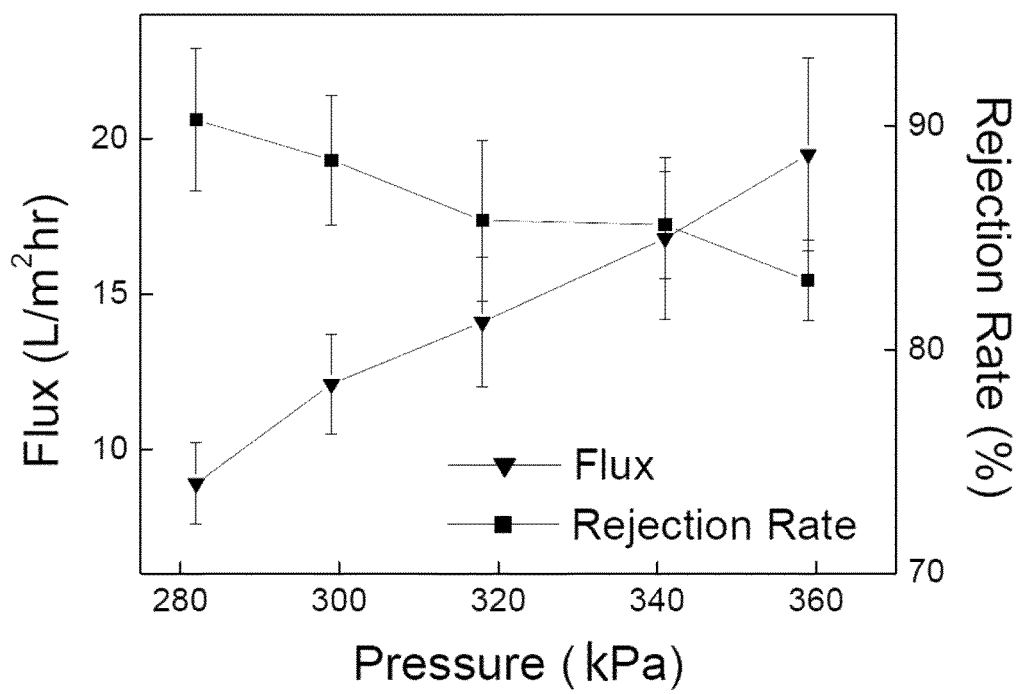
FIG. 7 Rejection rates and flux performance of the fabricated sample operated within a pressure range of 282-358 kPa with a feed solution of pH 2.0 according to Example 3 of the presently claimed invention.

Based on the design principle shown in Table 1, Solution A1 was prepared by mixing 0.4% PEI and 0.05% PIP in water; Solution A2 was of 0.05% MPD and 0.1% SDS; and Solution B was of 0.1% TMC in hexane. The first IFP was carried out using Solution A1 and Solution B on the inner surface of the PES hollow fiber UF membranes. After ageing at 50° C. for 2 hours, the second layer was fabricated by IFP again with Solution A2 and Solution B. The membrane composites were then rinsed by DI water for 10 minutes followed by a heat treatment at 60° C. for 2 hours. The rejection rates and water flux of the membrane composites were measured at room temperature by an organic dye compound, crystal violet ($C_{25}H_{30}N_3Cl.9H_2O$, MW=407.98), with a pH=10 feed solution. The results are shown in FIG. 6, and it can be seen that the water flux of this composite ranges from 9 to 18 L/m$^2$hr with a rejection rate between 92% and 98% under the operation pressure of 280-360 kPa.

EXAMPLE 3

Based on the design principle shown in Table 1, Solution A1 was prepared by mixing 0.3% PEI and 0.2% PIP in water; Solution A2 was of 0.15% MPD and 0.1% SDS; and Solution B was of 0.1% TMC in hexane. The first IFP was carried out using Solution A1 and Solution B on the inner surface of the PVDF hollow fiber UF membranes. After ageing at 80° C. for 4 hours, the second layer was fabricated by IFP again with Solution A2 and Solution B. The membrane composites were then heat-treated at 60° C. for 5 hours. The rejection rate and water flux of this membrane composite were measured by crystal violet with a pH=2 feed solution at 10° C. The results are shown in FIG. 6, and it can be seen that the water flux of this composite ranges from 8 to 19 L/m²hr with a rejection rate between 82% and 92% under the operation pressure of 280-360 KPa.

EXAMPLE 4

Based on the design principle shown in Table 1, Solution A1 was prepared by mixing 0.1% PEI and 0.05% PIP in water; Solution A2 was of 0.02% MPD and 0.1% SDS; and Solution B was of 0.1% TMC in hexane. The first IFP was carried out using Solution A1 and Solution B on the inner surface of the PVDF hollow fiber UF membranes. After ageing at 60° C. for 2 hours, the second layer was fabricated by IFP again with Solution A2 and Solution B. The membrane composites were then rinsed by DI water for 10 minutes followed by a heat treatment at 60° C. for 1 hour. The rejection rate and water flux of this membrane composite were measured by crystal violet under pressure of 300 kPa and at room temperature, but with a more complex solution composition as shown in Table 2 showing rejection rates of different solutes by the hollow fiber NF membrane composite fabricated by the Example 4 of the present invention.

TABLE 2

| Solute | Chemical Formula | Molecular Weight | Rejection Rate % |
|---|---|---|---|
| Crystal Violet | $C_{25}H_{30}ClN_3$ | 407.0 | 86.5(6) |
| Methyl Orange | $C_{14}H_{14}N_3NaO_3S$ | 327.33 | 74.0(5) |
| Neutral Red | $C_{15}H_{17}ClN_4$ | 288.78 | 71.0(7) |
| Calcium | $Ca^{2+}$ | 40 | 42.3(3) |
| Magnesium | $Mg^{2+}$ | 24 | 46.1(4) |

The results show that the presently claimed membrane composite can provide the target compound, crystal violet ($C_{25}H_{30}ClN_3$, with molecular weight of 407 Da), with a rejection rate of 86.5% even at this extremely complex feed solution composition. This outcome also further confirms the cut-off characteristic of this membrane composite is at MW=400 Da with 80% rejection.

According to an embodiment of the presently claimed invention, a hollow fiber nanofiltration membrane composite comprising of polyvinylidene fluoride (PVDF) or polyethersulfone (PES) ultrafiltration hollow fiber membrane is fabricated with multiple polyamide layers through the stepwise interfacial polymerizations (IFP) strategy. This is implemented using the interaction of diamine mixtures with ethyl chloride on the inner surface of the hollow fiber membranes. The membrane composite with the said diamine mixtures are derived synergistically using the branched polyethyleneimine (PEI), 1,3-phenylenediamine (MPD) and piperazine (PIP). A membrane composite with the double-coating layer is generated through the IFP with different reagent solution designs (design ranges stated in Table 1). After each IFP process, the membrane composites are heat-treated at 50-80° C. for 1-5 hours for a controlled curing process.

The membrane composite can provide with a rejection rate of above 80% for compounds having a molecular weight at 400 Da and a water flux value of 8-20 L/m²hr under a driving pressure range of 0.2-0.4 MPa, and it works at the pH range of 2-10. The membrane composite is capable of working under a temperature condition ranging from 10 to 40° C. with a rejection rate higher than 80% for compounds having a molecular weight of 400 Da.

According to another embodiment of the presently claimed invention, the first IFP is performed using a mixture of 0.1-0.5 wt. % PEI and 0.05-0.2 wt. % PIP as the diamine reactants. The second IFP is performed using a mixture of 0.05-0.2 wt. % MPD and 0.1 wt. % SDS as the aqueous reactants.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for fabricating a hollow fiber nanofiltration (NF) membrane composite comprising:
   providing at least one hollow fiber ultrafiltration (UF) membrane;
   injecting a first monomeric polyamine reactant into at least one hollow channel of the hollow fiber UF membrane;
   injecting a first monomeric amine-reactive polyfunctional aromatic or cycloaliphatic acyl halide into the hollow channel of the hollow fiber UF membrane to react with the first monomeric polyamine reactant to form a polymer layer on an inner surface of the hollow fiber UF membrane through a first interfacial polymerization;
   injecting a second monomeric polyamine reactant into the hollow channel of the hollow fiber UF membrane; and
   injecting a second monomeric amine-reactive polyfunctional aromatic or cycloaliphatic acyl halide into the hollow channel of the hollow fiber UF membrane to react with the second monomeric polyamine reactant to form a NF-functionalized layer on the polymer layer through a second interfacial polymerization,
   wherein said first monmeric polyamine reactant comprises polyethyleneimine (PEI) with a molecular weight of 40,000 Da at a concentration of 0.1-0.5 wt. % and piperazine (PIP) at a concentration of 0.05-0.2 wt. % dissolved in water and said second monomeric polyamine reactant comprises 1,3-phenylenediamine (MPD) at a concentration of 0.05-0.2 wt % and sodiumdodecylsulfate (SDS) at a concentration of 0.1 wt. % dissolved in water.

2. The method of claim 1, wherein the first and the second monomeric amine-reactive polyfunctional aromatic or cycloaliphatic acyl halide contain at least about two acyl halide groups per molecule.

3. The method of claim 1, further comprising curing the polymer layer at 50-80° C. for 1-5 hr after the first interfacial polymerization.

4. The method of claim 1, further comprising curing the NF-functionalized layer at 50-80° C. for 1-5 hr after the second interfacial polymerization.

5. The method of claim 1, wherein the first and/or the second monomeric amine-reactive polyfunctional aromatic or cycloaliphatic acyl halide comprises trimesoylchloride (TMC) at a concentration of 0.1 wt. % dissolved in hexane.

6. A hollow fiber nanofitration membrane composite fabricated by the method of claim 1.

7. The hollow fiber nanofitration membrane composite of claim 6, wherein a NF membrane product comprising the hollow fiber NF membrane composite provides at least 80% rejection rate for compounds having a molecular weight at 400 Da and a water flux value of 8-20 L/m²hr under a driving pressure range of 0.2-0.4 MPa.

8. The hollow fiber nanofitration membrane composite of claim 6, wherein a NF membrane product comprising the hollow fiber NF membrane composite works at a pH range of 2-10 with a rejection rate higher than 80% for compounds having a molecular weight of 400 Da.

9. A hollow fiber nanofitration membrane composite comprising:
- a hollow fiber UF membrane comprising polyvinylidene fluoride (PVDF);
- a polymer layer formed on the inner surface of the hollow fiber UF membrane, and comprising a first cross-linked aromatic polyamides, wherein the first cross-linked aromatic polyamides is formed by reacting a first monomeric polyamine reactant comprising PEI having a molecular weight of 40,000 Da at a concentration of 0.1-0.5 wt. % dissolved in water with a solution of TMC in hexane at a concentration of 0.1 wt. %; and
- a NF-functionalized layer formed on the polymer layer, and comprising a second cross-linked aromatic polyamides, wherein the second cross-linked aromatic polyamides is formed by reacting a second monomeric polyamine reactant comprising MPD at a concentration of 0.05-0.2 wt % and SDS at a concentration of 0.1 wt. % dissolved in water with a solution of TMC in hexane at a concentration of 0.1 wt. %.

10. A system for performing the method of claim 1, comprising:
- a reactant tank for holding reactants;
- a membrane module for holding the hollow fiber UF membrane;
- a tube for transporting the reactants; and
- a pump for injecting the reactants into the hollow fiber UF membrane.

11. The method of claim 1, wherein the hollow fiber UF membrane comprises polyvinylidene fluoride (PVDF).

* * * * *